(12) United States Patent
Hira et al.

(10) Patent No.: US 8,935,778 B2
(45) Date of Patent: Jan. 13, 2015

(54) MAINTAINING DATA INTEGRITY

(75) Inventors: Jay Harish Hira, Pune (IN);
Narayanan Krishnan, Thane (IN)

(73) Assignee: International Business Machines Corporation, Armonk, NY (US)

(*) Notice: Subject to any disclaimer, the term of this patent is extended or adjusted under 35 U.S.C. 154(b) by 379 days.

(21) Appl. No.: 13/097,735

(22) Filed: Apr. 29, 2011

(65) Prior Publication Data
US 2012/0278885 A1 Nov. 1, 2012

(51) Int. Cl.
*H04L 29/06* (2006.01)
*G06F 21/64* (2013.01)

(52) U.S. Cl.
CPC .................................. *G06F 21/645* (2013.01)
USPC .............................. 726/22; 713/179; 713/181

(58) Field of Classification Search
CPC ..................................................... G06F 21/645
USPC ..................................... 726/22; 713/179, 181
See application file for complete search history.

(56) References Cited

U.S. PATENT DOCUMENTS

| | | | |
|---|---|---|---|
| 6,338,149 B1* | 1/2002 | Ciccone et al. | 714/38.12 |
| 7,233,948 B1* | 6/2007 | Shamoon et al. | 1/1 |
| 2001/0044820 A1 | 11/2001 | Scott | |
| 2002/0023226 A1 | 2/2002 | Takagi | |
| 2004/0003248 A1 | 1/2004 | Arkhipov | |
| 2004/0199508 A1* | 10/2004 | Radatti | 707/8 |
| 2006/0053178 A1* | 3/2006 | van Ingen et al. | 707/204 |
| 2007/0186127 A1* | 8/2007 | Desai et al. | 714/13 |
| 2009/0070356 A1* | 3/2009 | Mimatsu | 707/101 |
| 2009/0100041 A1* | 4/2009 | Wilson | 707/5 |
| 2009/0100518 A1 | 4/2009 | Overcash | |
| 2009/0106603 A1* | 4/2009 | Dilman et al. | 714/42 |
| 2009/0319435 A1* | 12/2009 | Little et al. | 705/76 |
| 2010/0107247 A1 | 4/2010 | Shani | |

* cited by examiner

*Primary Examiner* — Justin T Darrow
(74) *Attorney, Agent, or Firm* — Reza Sarbakhsh; Ronald Kaschak (57) ABSTRACT

Aspects of the present invention maintain data integrity of a monitored data object in a monitored storage repository. A first security value for the monitored data object is determined. The first security value is stored along with an authentic copy of the monitored data object in the secure repository. The second security value for the monitored data object is determined after a predetermined time interval. The first security value is compared with the second security value. An alert is generated in response to determining a difference between the second security value and the first security value.

20 Claims, 8 Drawing Sheets

MAINTAINING DATA INTEGRITY

TECHNICAL FIELD

The disclosure relates generally to data monitoring, and more specifically, to a method, computer program product, and computer system for maintaining data integrity.

BACKGROUND

Today most organizations utilize the Internet for advertising their products, attracting prospective customers, engaging with current customers to solve their problems and even executing transactions over the wire. Security is a key concern during online transactions. Commercial Internet transactions, for example, Internet banking, credit card purchases, and the like are only as secure as the weakest link. Current online transaction risks increase due to constant attacks from cyber rookies and professionals alike. Typically, these attacks exploit vulnerabilities of existing computer communication protocols, as well as vulnerabilities of individual computers, such as web servers on a network.

There are general types of threats that are commonly launched against networked computers. One such type can be broadly classified as unauthorized access. Unauthorized access refers to a number of different attacks. The goal of these attacks is to access some resources that the computer would not normally provide to the attacker. Website defacement is a common example of the unauthorized access attacks. The website defacement is an attack on a website that changes the visual appearance of the site or a webpage. Once defaced, the website, or at least some of its pages, may no longer appear or function as originally designed. As a result, many associated damaging effects may occur such as, loss of business, reputation damages, legal entanglements—when transactions, reports filing and the like fail to be available. Therefore, it becomes increasingly important for many organizations to have a protection system that can detect any type of malicious data manipulation in a timely fashion.

SUMMARY

In one aspect, a method for maintaining data integrity of a monitored data object in a monitored storage repository is provided. The method comprises a computer determining a first security value for the monitored data object. The method further comprises the computer storing the first security value and a copy of the monitored data object in a secure repository. The method further comprises the computer determining a second security value for the monitored data object after a predetermined time interval. The method further comprises the computer comparing the second security value with the first security value. The method further comprises the computer generating an alert in response to determining a difference between the second security value and the first security value.

In another aspect, a computer program product for maintaining data integrity of a monitored data object in a monitored storage repository is provided. The computer program product comprises one or more computer-readable tangible storage devices. The computer program product further comprises program instructions, stored on at least one of the one or more computer-readable tangible storage devices. The program instructions comprise first program instructions to determine a first security value for a monitored data object. The program instructions further comprise second program instructions to store the first security value and a copy of the monitored data object in a secure repository. The program instructions further comprise third program instructions to determine a second security value for the monitored data object after a predetermined time interval. The program instructions further comprise fourth program instructions to compare the second security value with the first security value. The program instructions further comprise fifth program instructions to generate an alert in response to a determined difference between the second security value and the first security value.

In another aspect, a computer system for maintaining data integrity of a monitored data object in a monitored storage repository is provided. The computer system comprises one or more processors, one or more computer-readable memories, and one or more computer-readable tangible storage devices. The computer system further comprises program instructions, stored on at least one of the one or more storage devices for execution by at least one of the one or more processors via at least one of the one or more memories. The program instructions comprise first program instructions to determine a first security value for a monitored data object. The program instructions further comprise second program instructions to store the first security value and a copy of the monitored data object in a secure repository. The program instructions further comprise third program instructions to determine a second security value for the monitored data object after a predetermined time interval. The program instructions further comprise fourth program instructions to compare the second security value with the first security value. The program instructions further comprise fifth program instructions to generate an alert in response to a determined difference between the second security value and the first security value.

DETAILED DESCRIPTION

Figure 1:
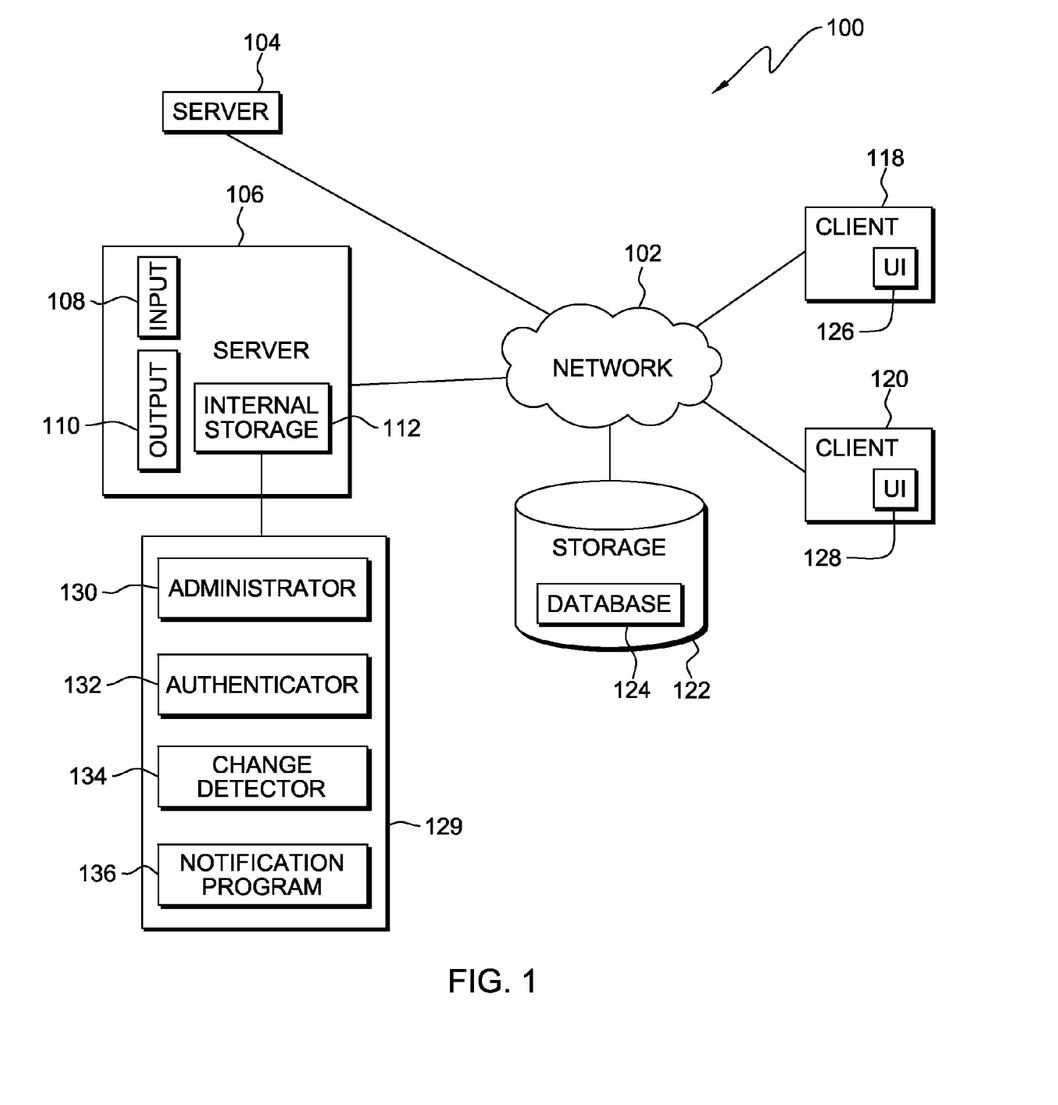
FIG. 1 is an illustration of a data processing environment depicted in accordance with an illustrative embodiment.

With reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 is a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 122. Client computers 118 and 120 connect to network 102. Client computers 118 and 120 may be, for example, mobile devices, telephones, cell phones, personal digital assistants, netbooks, laptop computers, tablet computers, desktop computers, and/or any other type of computing devices. In the depicted example, server computer 106 provides information, such as information computed locally or extracted from other computers on the network 102, to client computers 118 and 120. Server computer 106 may contain an input 108 and output 110 (an I/O device). Client computers 118 and 120 are clients to server computer 106 in this example. Client computers 118 and 120 may contain user interfaces (UIs) 126 and 128, respectively, that may display information about detected data changes. UIs 126 and 128 can be, for example, graphical user interfaces (GUIs) or web user interfaces (WUIs). Network data processing system 100 may include additional server computers, client computers, displays and other devices not shown.

Integrity protection application program 129 located in network data processing system 100 may be stored on one or more computer readable storage devices and downloaded to a data processing system or other device for use. Integrity protection application program 129 may include various programs or program components, such as administrator program 130, authenticator program 132, change detector program 134, and notification program 136. Administrator program 130, authenticator program 132, change detector program 134, and notification program 136 may be stored on one or more computer readable storage devices, such as internal storage 112 on server computer 106, and downloaded to server 104 over network 102 for use in data integrity protection.

Administrator program 130 may be, for example, a computer program or program component for obtaining information about a monitored data and for configuring detection and response mechanisms. Authenticator program 132 may be, for example, a computer program or program component for provisioning secure access to monitored and secure data repositories. Change detector program 134 may be, for example, a computer program or program component for detecting a malicious or unauthorized change. Notification program 136 may be, for example, a computer program or program component for generating a notification in response to a detected change. In one embodiment, administrator program 130, authenticator program 132, change detector program 134, and notification program 136 run on the same server 106, as shown in FIG. 1. However, in various embodiments it may be necessary or desirable to run one or more of administrator program 130, authenticator program 132, change detector program 134, and notification program 136 on different servers.

Data gathered, generated, and maintained for use by various programs listed herein may be kept in internal storage 112 of server computer 106 or in one or more databases 124 of storage unit 122.

In the depicted example, network data processing system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as an intranet, a local area network (LAN), or a wide area network (WAN). FIG. 1 is intended as an example, and not as an architectural limitation for the different embodiments.

In these examples, client computer 118 may be a client data processing system that may receive and/or display a notification generated by notification program 136, which may include, for example, information about a detected mismatch of a security value for the monitored data object. Administrator program 130, authenticator program 132, change detector program 134, and notification program 136 reside within integrity protection application program 129 and may be localized on one server 106 and/or distributed between two or more servers. The programs may communicate via local and/or remote processes such as in accordance with a signal having one or more data packets (for example, but not limited to, data from one program interacting with another program in a local system, distributed system, and/or across a network 102 with other systems via the signal).

Figure 2:
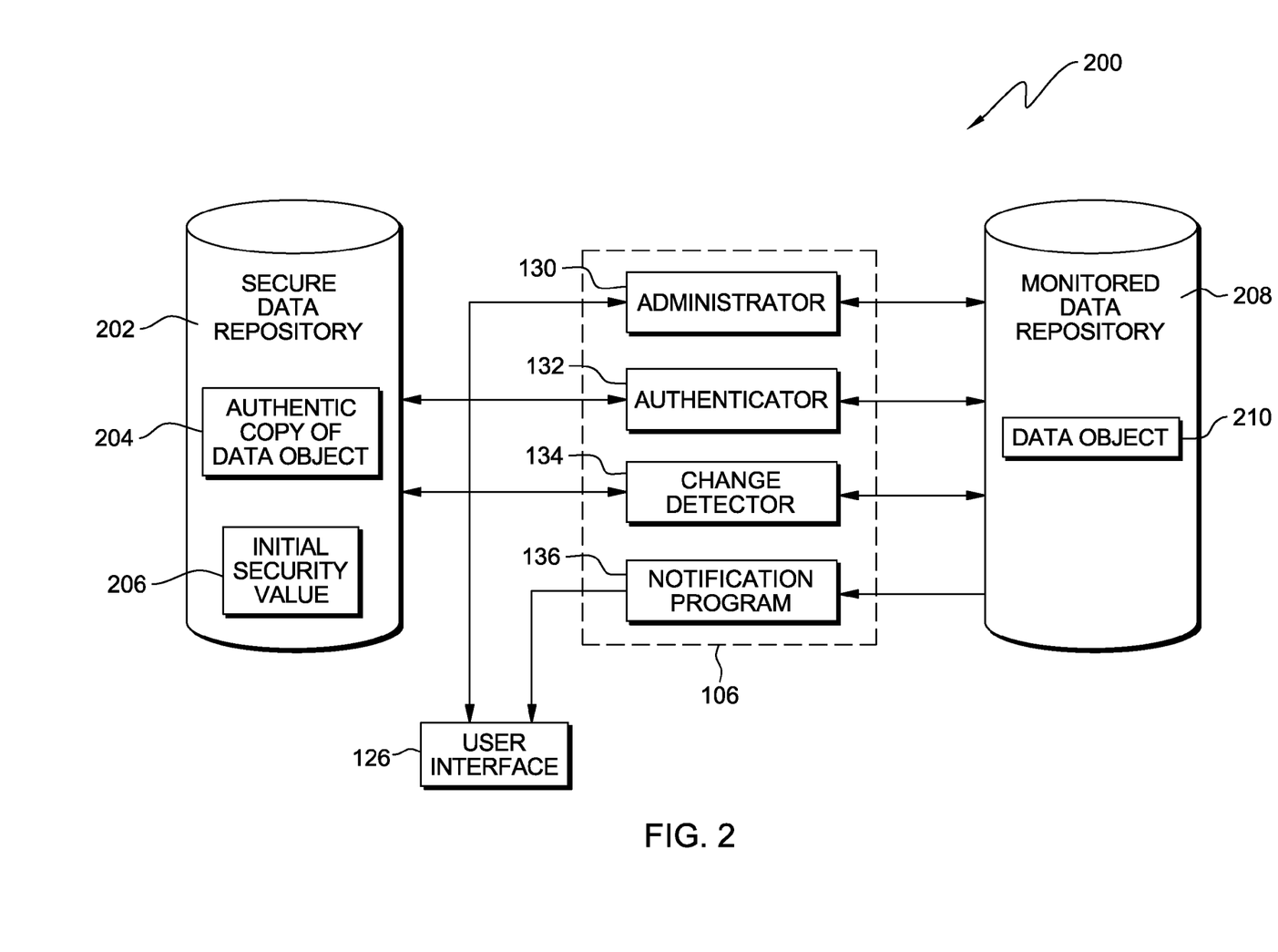
FIG. 2 is a block diagram of an illustrative embodiment integrated within a typical data monitoring infrastructure.

Turning now to FIG. 2, a block diagram of an illustrative embodiment integrated within a typical data monitoring infrastructure. In this example, data protection infrastructure 200 includes a monitored data repository 208, one or more servers 106 running administrator program 130, authenticator program 132, change detector program 134, and notification program 136, and a secure data repository 202. Monitored data repository 208 may be protected by a firewall (not shown).

Administrator program 130 may interact with monitored data repository 208 to obtain or track the information stored in monitored data repository 208. For example, administrator program 130 may track information reflecting various data objects stored in monitored data repository 208. The term "data object", as used herein, refers both to a complete unit of data such as a file, a webpage, a document, or any discrete unit of data, as well as portions or pieces of same. As used herein, the term "data repository" refers to any structured storage system that maintains an organized set of data including, but not limited to, a website, corporate document storage, a folder, a relational database, and the like. The term "monitored" as used herein includes a portion of data repository for which change information is desired to be monitored, analyzed, stored and/or communicated. For example, if monitored data repository 208 is a web site, administrator program 130 may track, and allow users to view information associated with specific webpages, specific files and specific images within the website. In an embodiment, administrator program 130 may also allow a user to specify at least one data object, such as a webpage or file, to be monitored, the frequency in which the monitored data repository 208 is monitored and at least one point of contact to be notified in the event the monitored data object 210 is altered, via user interface 126. As will be apparent to a person skilled in the art, a webpage typically consists of static and dynamic information. At least some embodiments of the present invention contemplate monitoring of only static data present on a webpage because, typically, there is no absolute control over the dynamic pieces of information over a prolonged period of time.

Secure data repository 202 is simply a secure data store, which enables secure storage of authentic copies of monitored data object 204. For example, in an embodiment, secure data repository may be a database, not connected to the Internet, which has access mechanisms that ensure only authorized read-only access to data by authenticated users. In alternative embodiments, secure data repository may comprise a Compact Disc Read-Only Memory (CD-ROM), write once Digital Versatile Disc (DVD), and the like. Various embodiments of authenticator program 132 may interact with the secure data repository 202 to enable secure storage of trusted copies of the monitored data objects 204.

Figure 3:
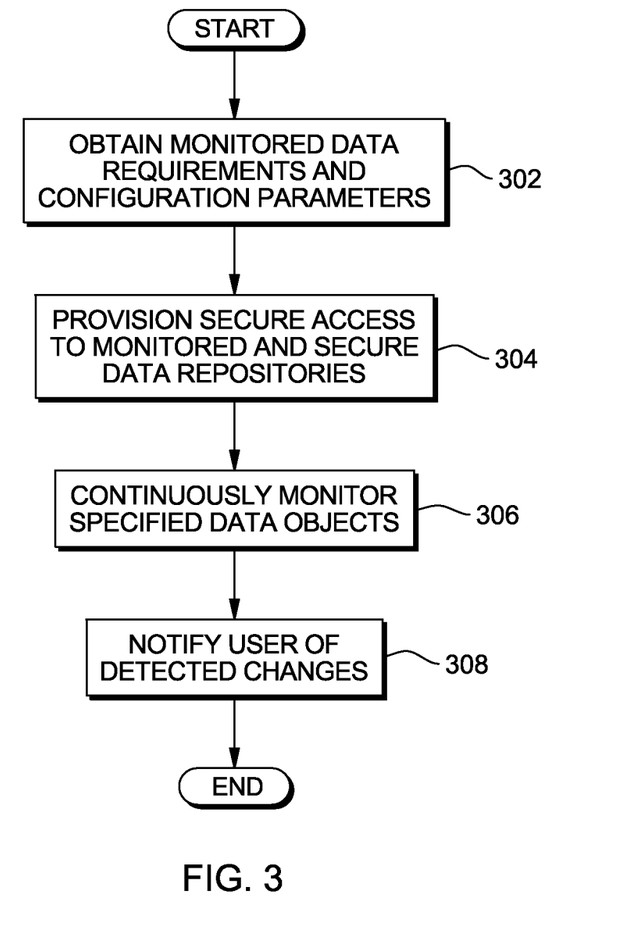
FIG. 3 is a high level flowchart of an exemplary method of detecting a data change, according to an embodiment of the present invention.

Referring now to FIG. 3, a high level flowchart of an exemplary method of detecting a data change, according to an embodiment of the present invention. At step 302, according to one aspect of the present invention, discussed further below in conjunction with FIG. 4, administrator program 130 obtains information about monitored data repository 208 including information about specific data objects 210 to be monitored. In an embodiment, administrator program 130 may also obtain configuration parameters and may transmit the obtained information to authenticator program 132, change detector program 134 and notification program 136. At step 304, according to another aspect of the present invention, discussed further below in conjunction with FIG. 5 authenticator program 132 interacts with monitored data repository 208 and secure data repository 202 to provision and manage secure access to those repositories for integrity protection application 129. At step 306, according to a further aspect of the present invention, discussed further below in conjunction with FIG. 6, change detector program 134 will periodically compare, at a predetermined frequency, security value of the monitored data object 210 with the initial security value 206 of trusted copy 204 of the monitored data object 210 stored in secure data repository 202. If change detector program 134 detects a mismatch of security values, such mismatch will be communicated to notification program 136. According to yet a further aspect of the present invention, discussed further below in conjunction with FIG. 7, at step 308, notification program 308 will notify a user about a detected change to the monitored data object 210. In an embodiment, notification program 136 may replace altered data object 210 in the monitored depository 208 with the secure copy of that data object 204 stored in the secure depository 202.

Figure 4:
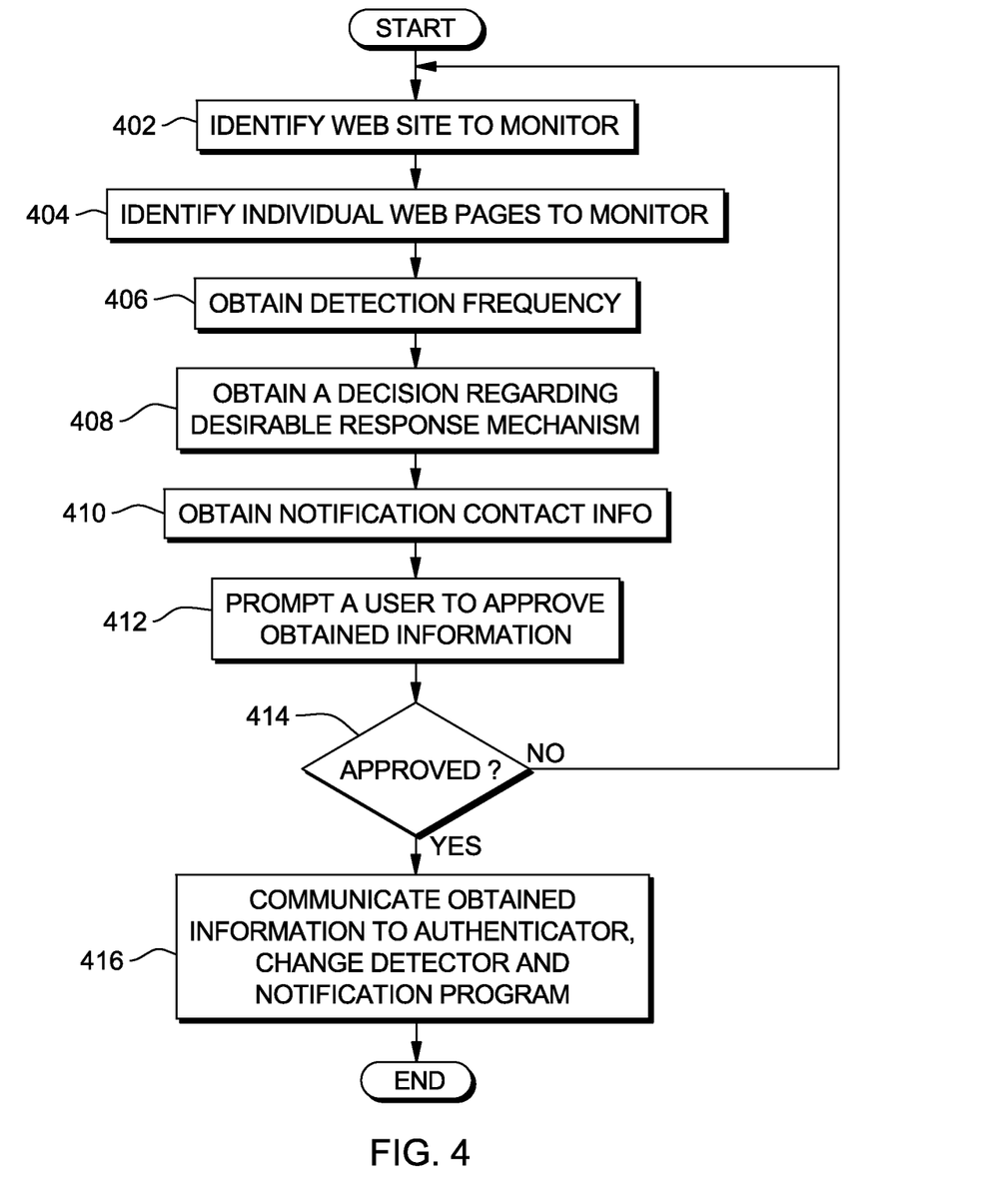
FIG. 4 is a flowchart of the administrator program, according to an embodiment of the present invention.

FIG. 4 is a flowchart of the administrator program 130. At step 402, data integrity administrator may obtain information about a data object to be monitored 210. As previously indicated, in an embodiment, the monitored data repository 208 may be a website. For the sake of clarity, the following description of this flowchart will be presented in the context of monitored website. In this embodiment, administrator program 130 may perform step 402 using UIs 126 and 128. For example, data integrity administrator may prompt a user to enter at least one website to be monitored. The term "website" as used herein refers to a collection of web pages that are linked together and are available on the Internet. The term "webpage" refers to a document published on a website and accessible over the Internet from any number of computers and includes, but is not limited to, text, images, video, music, and graphics that is contained within the website being monitored 208. In addition to allowing the user to specify at least one website to be monitored 208, at step 404 the administrator program 10 may allow the user to select specific webpage(s) (data object(s)) within the monitored website (data repository) 208.

As previously indicated, the administrator program 130 may also obtain a plurality of configuration parameters. At step 406, administrator program 130 may allow the user to specify a frequency at which change detector program 134 will check for anomalies in the monitored website 208. It must be noted that an optimum frequency may depend on business requirements for a specific website. At step 408, administrator program 130 may prompt the user to select another configuration parameter—a desirable response mechanism. One of the presented options, according to an embodiment, may allow the user to configure data integrity application 129 in such a way that if the change detector program 134 detects a content change, notification program 136 can automatically restore an unaltered copy 204 of the changed webpage 210. In addition, at step 410, administrator program 130 may allow the user to specify at least one contact person to be notified in the event a change is detected in the monitored website 208. As will be apparent to a person skilled in the art, administrator program 130 may provide an ability to assign different points of contact for different monitored data objects 210, such as webpages. At step 412, administrator program 130 may invite the user to approve the provided configuration parameters. The user will have an opportunity to either approve or resubmit the configuration parameters. If the user chooses to resubmit the configuration parameters at step 414, the administrator program 130 returns to step 402. Once the user is satisfied with the configuration parameters and chooses to approve them, at step 416 the administrator program 130 will communicate the configuration parameters to authenticator program 132, change detector program 134 and notification program 136.

Figure 5:
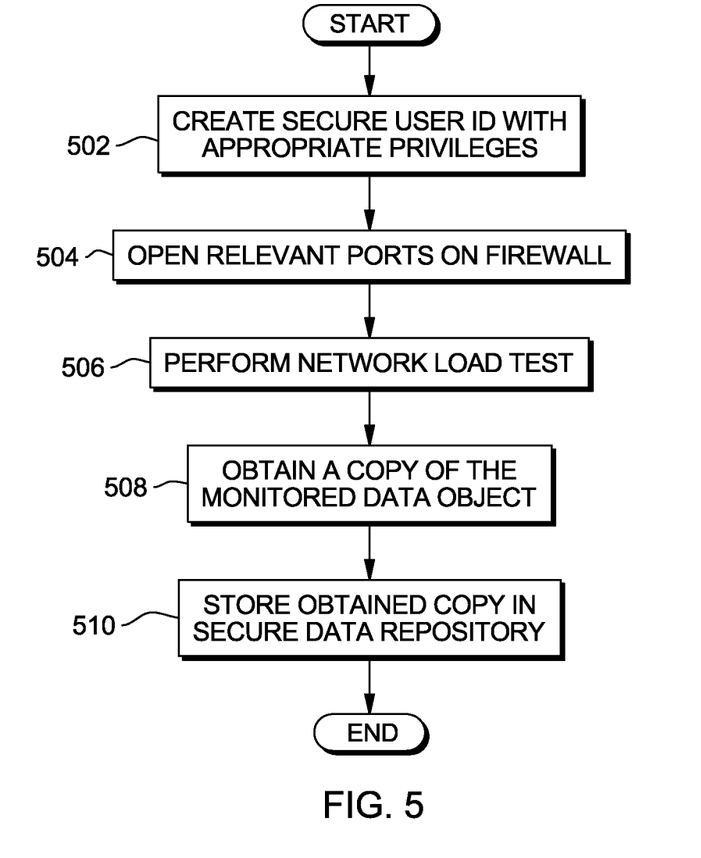
FIG. 5 is a flowchart of the authenticator program, according to an embodiment of the present invention.

FIG. 5 is a flow chart of the authenticator program, according to an embodiment of the present invention. According to another aspect of the present invention, authenticator program 132 may interact with the monitored data repository 208 to provision appropriate access to the monitored data objects 210 for change detector program 134 and notification program 136. In an embodiment, authenticator program 132, at step 502, may request monitored data repository 208 to create a new user ID with appropriate privileges to access the monitored data object 210. If monitored data repository 208 contains data belonging to different organizations or different business units within an organization, it might be desirable to create different user IDs for each organization or business unit. In addition, various embodiments of the present invention contemplate maintaining different configuration parameters for each organization or business unit. Similarly, authenticator program 132 may provision access to the secure data repository 202 for storing and accessing secure data. Furthermore, as previously indicated, monitored data repository 208 may be protected by a firewall (not shown). In various embodiments, authenticator program 132 will interact with the firewall to open dynamically negotiated ports which will allow access to monitored data objects 210 (step 504). Once a secure communication link between data integrity application 129 and monitored data repository 208 is established, according to this embodiment, the authenticator program 132 may perform a network load test, at step 506. The analysis of network load may be desirable if monitored data object 210 comprises a large volume data file such as an image, video, audio, and the like. This test may be accomplished by, for example, transmitting a test packet to the monitored data repository 208. After establishing the secure communication link between data integration application 129 and both monitored data repository 208 and secure data repository 202, authenticator program 132 will obtain a copy of the monitored data object 210, at step 508, and store that copy in the secure data repository 202, at step 510. In such a manner, secure data repository 202 now contains an authentic copy of the monitored data object 204.

Figure 6:
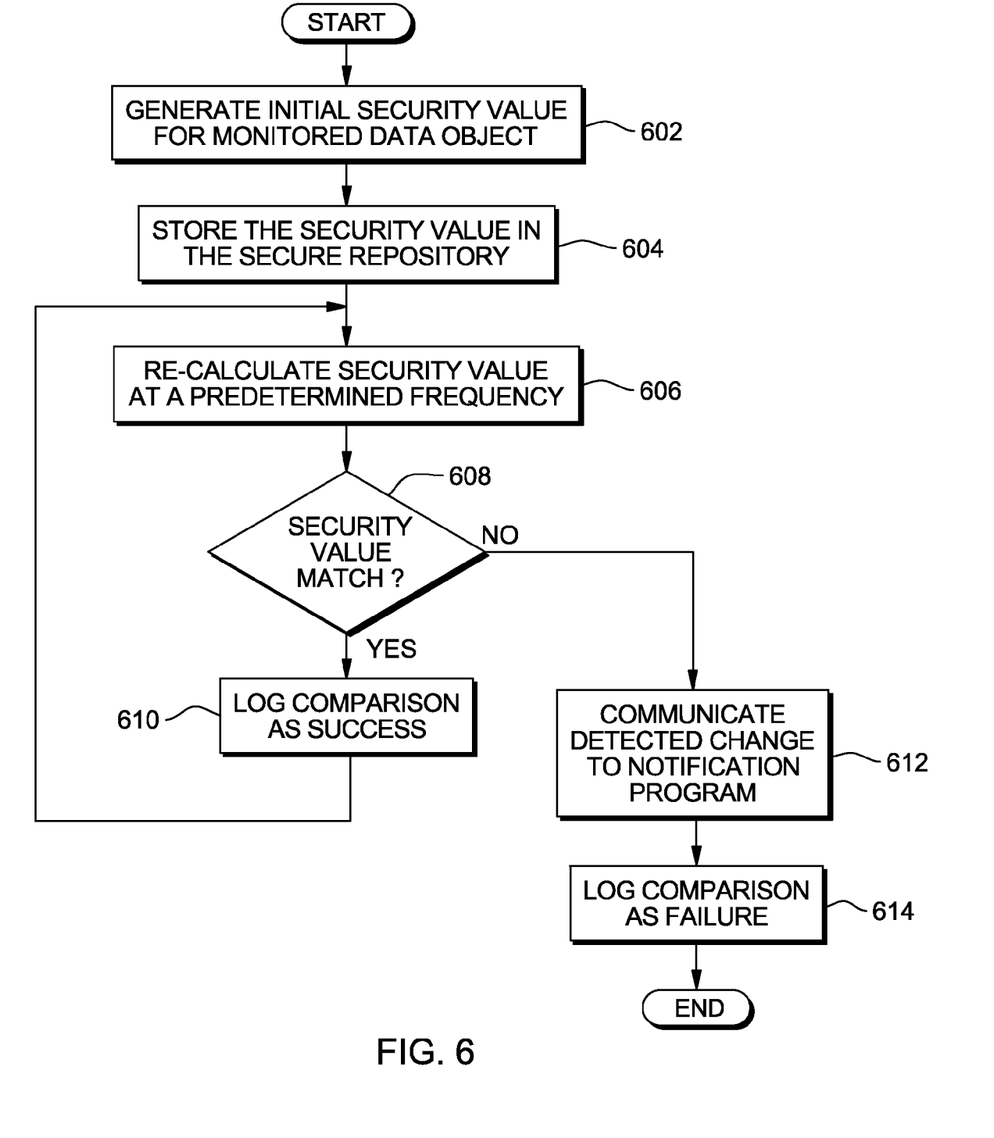
FIG. 6 is a flowchart of the change detector program, according to an embodiment of the present invention.

FIG. 6 is a flow chart of the change detector program, according to an embodiment of the present invention. At step 602, change detector program 134 generates an initial security value 206 for the monitored data object 210. To generate the security value, change detector program 134 reads the monitored data object 210 from the monitored data repository 208 via the secure communication link established by the authenticator program 132. Change detector program 134 may employ a variety of encoding schemes known to the one skilled in the art to generate a security value. According to some embodiments of the present invention the identification of a change may be carried out by using Hash functions, such as a cryptographic Hash function. For example, if the monitored data object 210 is a webpage, Hash function may be employed to encode the source code of the monitored webpage 210. The Hash encoding or Hash function is a mechanism enabling to transform data (for example, but not limited to, lines of HTML source code) into a substantially much smaller sequence of numbers and/or characters which can be read.

In a preferred embodiment, change detector program 134 calculates security values by employing a Cyclic Redundancy Check (CRC) function to generate a CRC value. Generally, a CRC function is a mathematical algorithm that acts on a block of data. The CRC divides the block of data by a particular number which is referred to as the "CRC polynomial" of the "generator polynomial" and leaves a remainder, referred to herein as the cyclic redundancy check value. Many different polynomials are in use, and the length of the polynomial determines the length of the CRC value. For example, a 32-bit polynomial will produce a 32 bit CRC value. It must be noted, that long polynomials ensure greater data accuracy, are usable over large amounts of data, and are more likely to detect changes in the data than short polynomials. Employing CRC function is advantageous if the monitored data object 210 is a folder which comprises a plurality of files. According to some embodiments of the present invention, change detector program 134 may calculate a CRC value for each file in the folder. It is contemplated that other encoding schemes known to one skilled in the art may also be used.

Once change detector program 134 generates the security value 206 for each of the data objects 210 being monitored, the change detector program 134 stores the generated initial security value 206 in the secure data repository 202 along with the authentic copies of the monitored data objects 210 (step 604). Change detector program 134 can accomplish this by utilizing the secure communication link between the data integrity protection application 129 and the secured data repository 202 established by authenticator program 132. At step 606, after change detector program 134 has successfully generated and stored initial security value 206 of the monitored data object, the detector program will begin to actively check the monitored data object 210 according to the configuration parameters provided by a user to the administrator program 130. In other words, change detector program 134 will perform step 606 by recalculating security value for the monitored data object 210 at a pre-determined frequency. In various embodiments, for the monitored object 210 of average criticality the frequency may be, for example, from about every 15 minutes to about 45 minutes, preferably about 30 minutes. At step 608, change detector program 134 compares the security value generated at step 606 with the initial security value 206 generated at step 602 and stored in the secure data repository 202. If at step 608 the change detector program 134 determines that the regenerated security value matches the initial security value, the monitored data object 210 will be considered authentic (unaltered).

According to yet another aspect of the present invention, in various embodiments, change detector program 134 may maintain a log file that will keep track of data integrity calculations. This log file may be created and maintained for the purpose of monitoring change detection activity and status of monitored data object 210. At step 610, the change detector program 134 will create an entry in the log file indicating that the comparison performed at step 608 was successful and will repeat step 606 after a set period of time as specified by the user at step 406. If at step 608 change detector program 134 determines that the regenerated security value does not match the initial security value 206, the monitored data object 210 will be considered altered. At step 612, the change detector program 134 will communicate the detected change to the notification program 136. At step 614, the change detector program 134 will log the comparison performed at step 608 as a failure.

Figure 7:
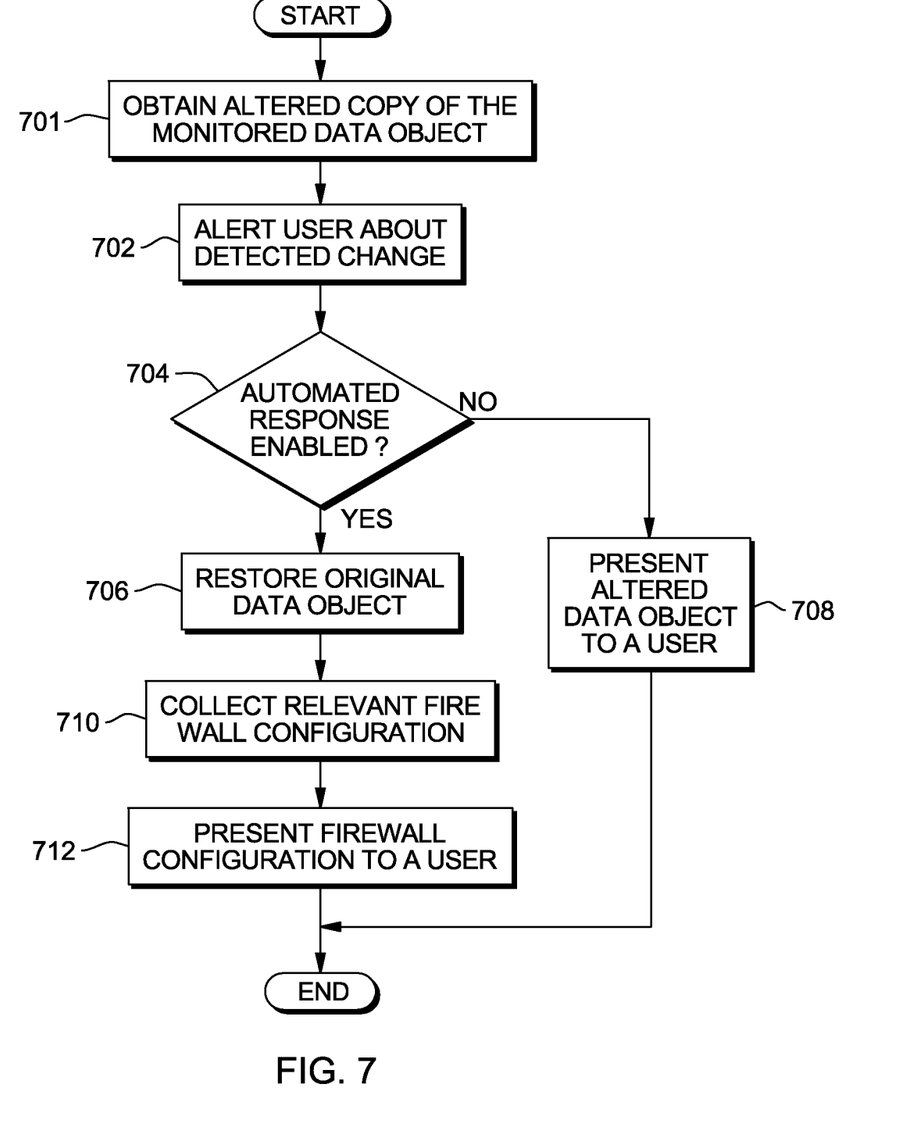
FIG. 7 is a flowchart of the notification program, according to an embodiment of the present invention.

FIG. 7 is a flow chart of the change notification program for alerting a user in response to a detected change, according to an embodiment of the present invention. At step 701, change notification program 136 will obtain an altered copy of the monitored data object 210 from the monitored repository 208. For example, if the monitored data object 210 is a webpage, change notification program 136 may capture a snapshot of the monitored webpage 210. At step 702, change notification program 136 will notify the contact person(s) that the user specified to the administrator program 130. In an embodiment, a notification message, called alert, may be generated. The generated alert may be delivered in any format, such as in an email, a Short Message Service (SMS) message, a Multimedia Messaging Service (MMS) message, a ringtone, a website link, a data stream, a pop-up window, or any combination thereof and the like. Further, in some embodiments, alerts may include unauthentic copies of the monitored data object 210. At step 704, change notification program 136 will determine whether configuration parameters obtained by administrator program 130 enable automated response to the detected change in the monitored data object 210. If change notification program 136 determines at step 704 that automated response is enabled, it may automatically replace altered copy of the monitored data object 210 in the monitored repository 208 with the authentic copy 204 stored in the secure data repository 202. In this case, therefore, authentic data object can be restored almost simultaneously with the detection of the falsification. Alternatively, in some embodiments, UI 126 may present the altered content of the monitored data object 210 to users for verification, instead of automatically restoring the original data object, at step 708. Users will have an ability to override automatic restoration of the authentic data object 204. This feature of the present invention enables users to keep legitimate changes to the monitored data objects 210. In such embodiments, notification program 136 will wait for users' approval for a predetermined period of time before automatically restoring the authentic data object content at step 706. Additionally, in some embodiments, at step 710, change notification program 136 may communicate with the firewall to collect relevant firewall configuration parameters. At step 712, change notification program 136 may present configuration parameters obtained at step 710 to users.

In the course of developing the invention, the inventors found that most organizations, these days, employ the services of a caching server. By utilizing a caching server, the host of the website often creates a perception to a user that the webpage is fast (loads quickly). However, this approach is susceptible to the "cache page" attack. When the page changes on the host web server, the cache does not typically change with immediate effect. For example, the actual content of a webpage might have changed on the host web server, but the content on the page being seen on the browser could come from an unaltered cache image. Therefore, for a robust data integrity protection, it is desirable to read the monitored data content from the host server rather than a caching server. According to an aspect of the present invention, the mechanism described herein advantageously allows to monitor data at the host server computer 106 inside the local network without accessing the Internet. This mechanism ensures that the only substantial time lag between the malicious or unauthorized change and detection is the interval between subsequent recalculation activities (step 606).

Figure 8:
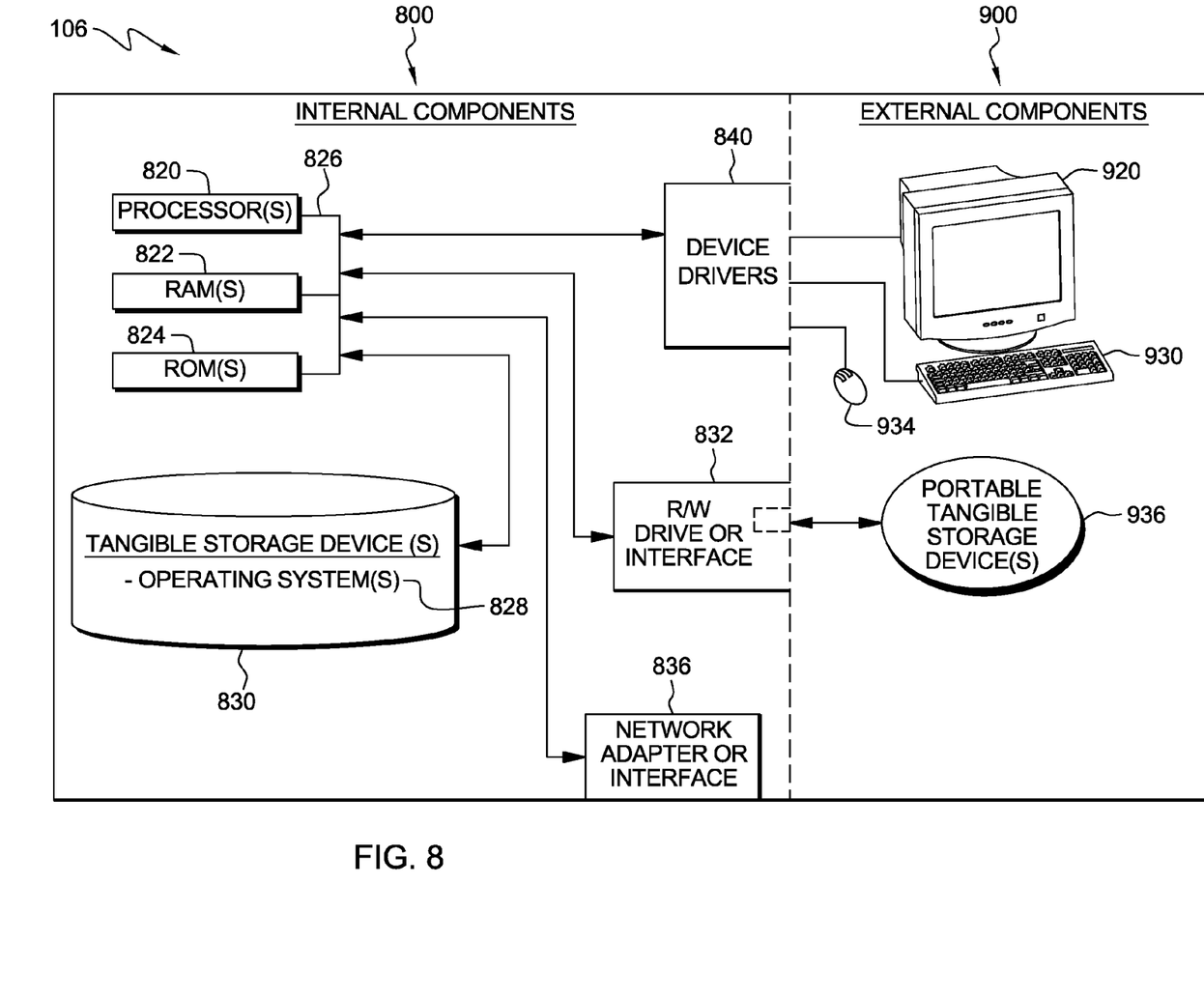
FIG. 8 illustrates internal and external components of a server computer in accordance with an illustrative embodiment.

FIG. 8 illustrates internal and external components of server computer 106 in accordance with an illustrative embodiment. Server computer 106 includes internal components 800 and external components 900. Internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828, administrator program 130, authenticator program 132, change detector program 134, and notification program 136 are stored on one or more of the computer-readable tangible storage devices 830 for execution by one or more of the processors 820 via one or more of the RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. The administrator program 130, authenticator program 132, change detector program 134, and notification program 136 can be stored on one or more of the portable computer-readable tangible storage devices 936, read via R/W drive or interface 832 and loaded into one or more computer-readable tangible storage devices 830.

Internal components 800 also include a network adapter or interface 836 such as a TCP/IP adapter card. The administrator program 130, authenticator program 132, change detector program 134, and notification program 136 can be downloaded to computer sever 106 from an external computer via a network (for example, the Internet, a local area network or other, wide area network) and network adapter or interface 836. From the network adapter or interface 836, the administrator program 130, authenticator program 132, change detector program 134, and notification program 136 are loaded into one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Administrator program 130, authenticator program 132, change detector program 134, and notification program 136 can be written in various programming languages including low-level, high-level, object-oriented or non object-oriented languages. Alternatively, the functions of alert policy analyzer 130, alert policy generator 132, alert policy evaluator 134, and alert policy deployer 136 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for maintaining data integrity of a monitored data object in a monitored storage repository, the method comprising the steps of:
a computer determining a first security value for a monitored data object in a monitored storage repository;
the computer storing the first security value and a copy of the monitored data object in a secure repository that is different from the monitored storage repository, and the secure repository being accessible by the computer using a secure access mechanism;
the computer determining a second security value for the monitored data object after a predetermined time interval;
the computer comparing the second security value with the first security value; and
the computer generating an alert in response to determining a difference between the second security value and the first security value.

2. The method of claim 1, further comprising the step of the computer replacing the monitored data object with the copy of the monitored data object stored in the secure repository in response to determining a difference between the second security value and the first security value.

3. The method of claim 1, wherein the steps of determining the first security value and determining the second security value further comprise the computer calculating a cyclic redundancy check (CRC) value for the monitored data object.

4. The method of claim 1, wherein the predetermined time interval is in a range of between about 15 minutes and about 45 minutes.

5. The method of claim 1, wherein the monitored storage repository comprises a website.

6. The method of claim 1, wherein the generated alert comprises an email, a SMS, a MMS, a ringtone, a website link, a data stream, a pop-up window or any combination thereof.

7. The method of claim 1, wherein the secure repository comprises a secure database.

8. A computer program product for maintaining data integrity of a monitored data object in a monitored storage repository, the computer program product comprising one or more computer-readable tangible storage devices and program instructions stored on at least one of the one or more computer-readable tangible storage devices, the program instructions comprising:

first program instructions to determine a first security value for a monitored data object in a monitored storage repository;

second program instructions to store the first security value and a copy of the monitored data object in a secure repository that is different from the monitored storage repository, and the secure repository being accessible by the computer using a secure access mechanism;

third program instructions to determine a second security value for the monitored data object after a predetermined time interval;

fourth program instructions to compare the second security value with the first security value; and fifth program instructions to generate an alert in response to a determined difference between the second security value and the first security value.

9. The computer program product of claim 8, further comprising sixth program instructions to replace the monitored data object with the copy of the monitored data object stored in the secure repository in response to a determined difference between the second security value and the first security value.

10. The computer program product of claim 8, wherein the first program instructions and the third program instructions further comprise seventh program instructions to calculate a cyclic redundancy check (CRC) value for the monitored data object.

11. The computer program product of claim 8, wherein the predetermined time interval is in a range of between about 15 minutes and about 45 minutes.

12. The computer program product of claim 8, wherein the monitored storage repository comprises a website.

13. The computer program product of claim 8, wherein the alert generated by the fifth program instructions comprises an email, a SMS, a MMS, a ringtone, a website link, a data stream, a pop-up window or any combination thereof.

14. The computer program product of claim 8, wherein the secure repository comprises a secure database.

15. A computer system for maintaining data integrity of a monitored data object in a monitored storage repository, the computer system comprising one or more processors, one or more computer-readable memories, one or more computer-readable tangible storage devices, and program instructions stored on at least one of the one or more storage devices for execution by at least one of the one or more processors via at least one of the one or more memories, the program instructions comprising:

first program instructions to determine a first security value for a monitored data object in a monitored storage repository;

second program instructions to store the first security value and a copy of the monitored data object in a secure repository that is different from the monitored storage repository, and the secure repository being accessible by the computer using a secure access mechanism;

third program instructions to determine a second security value for the monitored data object after a predetermined time interval;

fourth program instructions to compare the second security value with the first security value; and fifth program instructions to generate an alert in response to a determined difference between the second security value and the first security value.

16. The computer system of claim 15, further comprising sixth program instructions to replace the monitored data object with the copy of the monitored data object stored in the secure repository in response to a determined difference between the second security value and the first security value.

17. The computer system of claim 15, wherein the first program instructions and the third program instructions further comprise seventh program instructions to calculate a cyclic redundancy check (CRC) value for the monitored data object.

18. The computer system of claim 15, wherein the predetermined time interval is in a range of between about 15 minutes and about 45 minutes.

19. The computer system of claim 15, wherein the monitored storage repository comprises a website.

20. The computer system of claim 15, wherein the secure repository comprises a secure database.

* * * * *